US012677874B2

(12) United States Patent
Guan et al.

(10) Patent No.:    US 12,677,874 B2
(45) Date of Patent:        Jul. 14, 2026

(54) SAFETY FEATURE FOR BATTERY CELL DESIGN

(71) Applicant: JUUL Labs, Inc., San Francisco, CA (US)

(72) Inventors: Jie Guan, Morgan Hill, CA (US); Nicholas R. Marker, Reno, NV (US); Erik A. Vaknine, San Jose, CA (US); Val Valentine, San Francisco, CA (US); Tianren Xu, Cupertino, CA (US); Qingcheng Zeng, San Jose, CA (US)

(73) Assignee: JUUL Labs, Inc., Washington, DC (US)

( * ) Notice: Subject to any disclaimer, the term of this patent is extended or adjusted under 35 U.S.C. 154(b) by 485 days.

(21) Appl. No.: 17/743,251

(22) Filed: May 12, 2022

(65) Prior Publication Data

US 2022/0264944 A1       Aug. 25, 2022

Related U.S. Application Data

(63) Continuation       of       application       No. PCT/US2020/060522, filed on Nov. 13, 2020.
(Continued)

(51) Int. Cl.
*A24F 40/40*          (2020.01)
*A24F 40/50*          (2020.01)
(Continued)

(52) U.S. Cl.
CPC .............. *A24F 40/40* (2020.01); *A24F 40/50* (2020.01); *A24F 40/70* (2020.01); *H01B 17/66* (2013.01);
(Continued)

(58) Field of Classification Search
None
See application file for complete search history.

(56)                    References Cited

U.S. PATENT DOCUMENTS 8,314,591 B2     11/2012   Terry et al.
8,746,240 B2      6/2014   Terry et al.
(Continued)

FOREIGN PATENT DOCUMENTS

CN            201104488 Y       8/2008
CN            102386449 A       3/2012
(Continued)

OTHER PUBLICATIONS

English machine translation of CN 204949520 U; Zhang; Jan. 13, 2016; 35 pages. (Year: 2016).*
(Continued)

*Primary Examiner* — Linda L Gray
(74) *Attorney, Agent, or Firm* — Mintz Levin Cohn Ferris Glovsky and Popeo, P.C.

(57)                    ABSTRACT

Aspects of the current subject matter relate to methods and system for protecting a battery cell and/or a /pack of multiple battery cells serving as a power source of a vaporizer device from developing a short-circuit in a vaporizer device. In one aspect, a vaporizer device is provided. The vaporizer device may include a power source including a battery and a power source lead extending outward from a distal end of the battery. The vaporizer device may further include a printed circuit board (PCB) electrically coupled to the power source via the power source lead extending outward from the battery. The vaporizer device may further include an insulator at least partially surrounding the power source lead. The insulator may be mechanically coupled to at least one of the power source and the PCB.

9 Claims, 7 Drawing Sheets

100

Related U.S. Application Data

(60) Provisional application No. 62/936,123, filed on Nov. 15, 2019.

(51) Int. Cl.

| | |
|---|---|
| *A24F 40/70* | (2020.01) |
| *H01B 3/30* | (2006.01) |
| *H01B 17/66* | (2006.01) |
| *H01M 50/247* | (2021.01) |
| *H01M 50/588* | (2021.01) |

(52) U.S. Cl.
CPC ....... *H01M 50/247* (2021.01); *H01M 50/588* (2021.01); *H01B 3/30* (2013.01); *H01M 2220/30* (2013.01)

(56) References Cited

U.S. PATENT DOCUMENTS

| | | | |
|---|---|---|---|
| 8,833,364 | B2 | 9/2014 | Buchberger |
| 8,978,663 | B2 | 3/2015 | Newton |
| 9,095,175 | B2 | 8/2015 | Terry et al. |
| 9,131,733 | B2 | 9/2015 | Liu |
| 9,155,336 | B2 | 10/2015 | Liu |
| 9,247,773 | B2 | 2/2016 | Memari et al. |
| 9,259,035 | B2 | 2/2016 | Terry et al. |
| 9,360,379 | B2 | 6/2016 | Liu |
| 9,364,025 | B2 | 6/2016 | Liu |
| 9,379,364 | B2 | 6/2016 | Alima |
| 9,451,793 | B2 | 9/2016 | Zhou |
| 9,497,997 | B2 | 11/2016 | Wu |
| 9,504,279 | B2 | 11/2016 | Chen |
| 9,555,203 | B2 | 1/2017 | Terry et al. |
| 9,572,372 | B2 | 2/2017 | Liu |
| 9,596,885 | B2 | 3/2017 | Liu |
| 9,627,661 | B2 | 4/2017 | Liu |
| 9,642,396 | B2 | 5/2017 | Liu |
| 9,668,518 | B2 | 6/2017 | Esses |
| 9,717,275 | B2 | 8/2017 | Liu |
| 9,723,872 | B2 | 8/2017 | Liu |
| 9,723,875 | B2 | 8/2017 | Liu |
| 9,743,691 | B2 | 8/2017 | Minskoff et al. |
| 9,788,576 | B2 | 10/2017 | Liu |
| 9,801,418 | B1 | 10/2017 | Liu |
| 9,901,120 | B2 | 2/2018 | Liu |
| 10,039,324 | B2 | 8/2018 | Liu |
| 10,092,713 | B2 | 10/2018 | Terry et al. |
| 10,130,119 | B2 | 11/2018 | Murison |
| 10,131,532 | B2 | 11/2018 | Murison et al. |
| 10,136,672 | B2 | 11/2018 | Minskoff et al. |
| 10,159,278 | B2 | 12/2018 | Minskoff et al. |
| 10,357,060 | B2 | 7/2019 | Rostami et al. |
| 10,383,368 | B2 | 8/2019 | Larson |
| 10,617,152 | B2 | 4/2020 | Force |
| 10,617,833 | B2 | 4/2020 | Alarcon |
| 10,631,572 | B2 | 4/2020 | Force |
| 10,932,490 | B2 | 3/2021 | Hejazi |
| 11,000,066 | B1 | 5/2021 | Tatsuta et al. |
| 11,035,704 | B2 | 6/2021 | Kane et al. |
| 11,122,837 | B2 | 9/2021 | Mizuguchi et al. |
| 11,196,274 | B2 | 12/2021 | Ambriz et al. |
| 2005/0016550 | A1 | 1/2005 | Katase |
| 2009/0192443 | A1 | 7/2009 | Collins, Jr. |
| 2010/0156193 | A1 | 6/2010 | Rhodes et al. |
| 2011/0277757 | A1 | 11/2011 | Terry et al. |
| 2012/0171520 | A1 | 7/2012 | Lee et al. |
| 2012/0199146 | A1 | 8/2012 | Marangos |
| 2013/0220315 | A1* | 8/2013 | Conley ................... A24F 40/44 |
| | | | 128/202.21 |
| 2013/0255675 | A1 | 10/2013 | Liu |
| 2014/0041655 | A1 | 2/2014 | Barron et al. |
| 2014/0060528 | A1 | 3/2014 | Liu |
| 2014/0060556 | A1 | 3/2014 | Liu |
| 2014/0109921 | A1 | 4/2014 | Chen |
| 2014/0150783 | A1 | 6/2014 | Liu |
| 2014/0175081 | A1 | 6/2014 | Hwa |
| 2014/0230835 | A1 | 8/2014 | Saliman |
| 2014/0290677 | A1 | 10/2014 | Liu |
| 2014/0334804 | A1 | 11/2014 | Choi |
| 2014/0373857 | A1 | 12/2014 | Steinberg |
| 2015/0013701 | A1 | 1/2015 | Liu |
| 2015/0047663 | A1 | 2/2015 | Liu |
| 2015/0059782 | A1 | 3/2015 | Liu |
| 2015/0107609 | A1 | 4/2015 | Liu |
| 2015/0128970 | A1 | 5/2015 | Liu |
| 2015/0164143 | A1 | 6/2015 | Maas |
| 2015/0173421 | A1 | 6/2015 | Hsieh |
| 2015/0189918 | A1 | 7/2015 | Liu |
| 2015/0208730 | A1* | 7/2015 | Li ......................... A24F 40/485 |
| | | | 131/329 |
| 2015/0223523 | A1 | 8/2015 | Mccullough |
| 2015/0305407 | A1 | 10/2015 | Li et al. |
| 2015/0351455 | A1 | 12/2015 | Liu |
| 2016/0021933 | A1 | 1/2016 | Thorens et al. |
| 2016/0073691 | A1 | 3/2016 | Liu |
| 2016/0095352 | A1 | 4/2016 | Liu |
| 2016/0106152 | A1 | 4/2016 | Liu |
| 2016/0113325 | A1 | 4/2016 | Liu |
| 2016/0120226 | A1 | 5/2016 | Rado |
| 2016/0150824 | A1 | 6/2016 | Memari et al. |
| 2016/0183592 | A1 | 6/2016 | Liu |
| 2016/0235124 | A1 | 8/2016 | Krietzman |
| 2016/0316818 | A1 | 11/2016 | Liu |
| 2016/0338411 | A1 | 11/2016 | Liu |
| 2016/0366936 | A1 | 12/2016 | Liu |
| 2016/0366942 | A1 | 12/2016 | Liu |
| 2016/0374392 | A1 | 12/2016 | Liu |
| 2017/0006919 | A1 | 1/2017 | Liu |
| 2017/0042229 | A1 | 2/2017 | Liu |
| 2017/0045150 | A1 | 2/2017 | Marsh |
| 2017/0045994 | A1 | 2/2017 | Murison |
| 2017/0079327 | A1 | 3/2017 | Wu et al. |
| 2017/0099878 | A1 | 4/2017 | Murison et al. |
| 2017/0135403 | A1 | 5/2017 | Liu |
| 2017/0208868 | A1 | 7/2017 | Li et al. |
| 2017/0231280 | A1 | 8/2017 | Anton |
| 2017/0258138 | A1 | 9/2017 | Rostami et al. |
| 2017/0258140 | A1 | 9/2017 | Rostami et al. |
| 2017/0301898 | A1 | 10/2017 | Lin |
| 2017/0325289 | A1 | 11/2017 | Liu |
| 2017/0325504 | A1 | 11/2017 | Liu |
| 2017/0359858 | A1 | 12/2017 | Liu |
| 2018/0014577 | A1 | 1/2018 | Qiu |
| 2018/0020731 | A1 | 1/2018 | Rasmussen et al. |
| 2018/0070638 | A1 | 3/2018 | Qiu |
| 2018/0151918 | A1 | 5/2018 | Boovaragavan et al. |
| 2018/0184722 | A1 | 7/2018 | Murison et al. |
| 2018/0279682 | A1 | 10/2018 | Guo et al. |
| 2018/0280637 | A1 | 10/2018 | Mayle et al. |
| 2018/0296777 | A1 | 10/2018 | Terry et al. |
| 2018/0331343 | A1 | 11/2018 | Wilson et al. |
| 2019/0029324 | A1 | 1/2019 | Liu |
| 2019/0037926 | A1 | 2/2019 | Qiu |
| 2020/0404977 | A1 | 12/2020 | Chen et al. |

FOREIGN PATENT DOCUMENTS

| | | |
|---|---|---|
| CN | 202800121 U | 3/2013 |
| CN | 203121011 U | 8/2013 |
| CN | 203168032 U | 9/2013 |
| CN | 203182011 U | 9/2013 |
| CN | 203234036 U | 10/2013 |
| CN | 203523810 U | 4/2014 |
| CN | 203633501 U | 6/2014 |
| CN | 104023775 A | 9/2014 |
| CN | 203986137 U | 12/2014 |
| CN | 204217907 U | 3/2015 |
| CN | 102970885 B | 5/2015 |
| CN | 104621716 A | 5/2015 |
| CN | 204466899 U | 7/2015 |
| CN | 103230099 B | 9/2015 |
| CN | 204905326 U | 12/2015 |
| CN | 106136324 A | 11/2016 |
| CN | 103989254 B | 4/2017 |

(56) References Cited

FOREIGN PATENT DOCUMENTS

| CN | 104055223 | B | 10/2017 |
| CN | 104366695 | B | 12/2017 |
| CN | 105191050 | B | 3/2018 |
| CN | 109562235 | A | 4/2019 |
| CN | 114641889 | A | 6/2022 |
| DE | 202015009950 | U1 | 11/2021 |
| EP | 0635903 | A1 | 1/1995 |
| EP | 3023016 | A1 | 5/2016 |
| EP | 3130238 | B1 | 5/2018 |
| EP | 3513671 | B1 | 4/2020 |
| EP | 3435793 | B1 | 7/2020 |
| EP | 3513672 | B1 | 9/2020 |
| EP | 3272238 | B1 | 11/2020 |
| EP | 3273810 | B1 | 4/2021 |
| EP | 3298912 | B1 | 1/2022 |
| EP | 3677135 | B1 | 1/2022 |
| EP | 3718423 | B1 | 1/2022 |
| EP | 3434121 | B1 | 2/2022 |
| EP | 3858159 | B1 | 8/2022 |
| EP | 3513670 | B1 | 11/2022 |
| EP | 3741227 | B1 | 2/2023 |
| EP | 3756486 | B1 | 4/2023 |
| EP | 3689161 | B1 | 5/2023 |
| EP | 3718421 | B1 | 5/2023 |
| EP | 3784072 | B1 | 5/2023 |
| EP | 3874973 | B1 | 5/2023 |
| JP | 2011024430 | A | 2/2011 |
| JP | 2012005412 | A | 1/2012 |
| KR | 20090008914 | U | 9/2009 |
| KR | 20130127412 | A | 11/2013 |
| KR | 101682319 | B1 | 12/2016 |
| KR | 20190055827 | A | 5/2019 |
| TW | 201805033 | A | 2/2018 |
| UA | 125298 | C2 | 2/2022 |
| WO | WO-2004080216 | A1 | 9/2004 |
| WO | WO-2007078273 | A1 | 7/2007 |
| WO | WO-2011050964 | A1 | 5/2011 |
| WO | WO-2011146174 | A2 | 11/2011 |
| WO | WO-2012091249 | A1 | 7/2012 |
| WO | WO-2012174677 | A1 | 12/2012 |
| WO | WO-2014020953 | A1 * | 2/2014 | ............ A24F 13/08 |
| WO | WO-2015018120 | A1 | 2/2015 |
| WO | WO-2015021612 | A1 | 2/2015 |
| WO | WO-2015021646 | A1 | 2/2015 |
| WO | WO-2015021651 | A1 | 2/2015 |
| WO | WO-2015021652 | A1 | 2/2015 |
| WO | WO-2015021658 | A1 | 2/2015 |
| WO | WO-2015027435 | A1 | 3/2015 |
| WO | WO-2015032055 | A1 | 3/2015 |
| WO | WO-2015032078 | A1 | 3/2015 |
| WO | WO-2015035557 | A1 | 3/2015 |
| WO | WO-2015077998 | A1 | 6/2015 |
| WO | WO-2015077999 | A1 | 6/2015 |
| WO | WO-2015078010 | A1 | 6/2015 |
| WO | WO-2015107551 | A2 | 7/2015 |
| WO | WO-2015109540 | A1 | 7/2015 |
| WO | WO-2015120588 | A1 | 8/2015 |
| WO | WO-2015120591 | A1 | 8/2015 |
| WO | WO-2015127609 | A1 | 9/2015 |
| WO | WO-2015143749 | A1 | 10/2015 |
| WO | WO-2015149406 | A1 | 10/2015 |
| WO | WO-2015157893 | A1 | 10/2015 |
| WO | WO-2015157901 | A1 | 10/2015 |
| WO | WO-2015161553 | A1 | 10/2015 |
| WO | WO-2015161555 | A1 | 10/2015 |
| WO | WO-2015161557 | A1 | 10/2015 |
| WO | WO-2015167033 | A1 | 11/2015 |
| WO | WO-2015168828 | A1 | 11/2015 |
| WO | WO-2015168912 | A1 | 11/2015 |
| WO | WO-2015180062 | A1 | 12/2015 |
| WO | WO-2015180071 | A1 | 12/2015 |
| WO | WO-2015180088 | A1 | 12/2015 |
| WO | WO-2015184590 | A1 | 12/2015 |
| WO | WO-2015190810 | A1 | 12/2015 |
| WO | WO-2015192301 | A1 | 12/2015 |
| WO | WO-2015192336 | A1 | 12/2015 |
| WO | WO-2015192337 | A1 | 12/2015 |
| WO | WO-2015196332 | A1 | 12/2015 |
| WO | WO-2016000136 | A1 | 1/2016 |
| WO | WO-2016000139 | A1 | 1/2016 |
| WO | WO-2016000206 | A1 | 1/2016 |
| WO | WO-2016000233 | A1 | 1/2016 |
| WO | WO-2016023181 | A1 | 2/2016 |
| WO | WO-2016023182 | A1 | 2/2016 |
| WO | WO-2016023183 | A1 | 2/2016 |
| WO | WO-2016026104 | A1 | 2/2016 |
| WO | WO-2016029344 | A1 | 3/2016 |
| WO | WO-2016029382 | A1 | 3/2016 |
| WO | WO-2016033734 | A1 | 3/2016 |
| WO | WO-2016041114 | A1 | 3/2016 |
| WO | WO-2016049855 | A1 | 4/2016 |
| WO | WO-2016054793 | A1 | 4/2016 |
| WO | WO-2016065532 | A1 | 5/2016 |
| WO | WO-2016065606 | A1 | 5/2016 |
| WO | WO-2016074228 | A1 | 5/2016 |
| WO | WO-2016074237 | A1 | 5/2016 |
| WO | WO-2016082074 | A1 | 6/2016 |
| WO | WO-2016082217 | A1 | 6/2016 |
| WO | WO-2016090601 | A1 | 6/2016 |
| WO | WO-2016090602 | A1 | 6/2016 |
| WO | WO-2016101141 | A1 | 6/2016 |
| WO | WO-2016101142 | A1 | 6/2016 |
| WO | WO-2016101143 | A1 | 6/2016 |
| WO | WO-2016101144 | A1 | 6/2016 |
| WO | WO-2016101150 | A1 | 6/2016 |
| WO | WO-2016106499 | A1 | 7/2016 |
| WO | WO-2016106500 | A1 | 7/2016 |
| WO | WO-2016109964 | A1 | 7/2016 |
| WO | WO-2016109965 | A1 | 7/2016 |
| WO | WO-2016119099 | A1 | 8/2016 |
| WO | WO-2016119121 | A1 | 8/2016 |
| WO | WO-2016119145 | A1 | 8/2016 |
| WO | WO-2016127293 | A1 | 8/2016 |
| WO | WO-2016127327 | A1 | 8/2016 |
| WO | WO-2016127401 | A1 | 8/2016 |
| WO | WO-2016149932 | A1 | 9/2016 |
| WO | WO-2016155104 | A1 | 10/2016 |
| WO | WO-2016155105 | A1 | 10/2016 |
| WO | WO-2016187803 | A1 | 12/2016 |
| WO | WO-2016201602 | A1 | 12/2016 |
| WO | WO-2017016323 | A1 | 2/2017 |
| WO | WO-2017075753 | A1 | 5/2017 |
| WO | WO-2017091926 | A1 | 6/2017 |
| WO | WO-2017101030 | A1 | 6/2017 |
| WO | WO-2017102969 | A1 | 6/2017 |
| WO | WO-2017113845 | A1 | 7/2017 |
| WO | WO-2017117742 | A1 | 7/2017 |
| WO | WO-2017121296 | A1 | 7/2017 |
| WO | WO-2017124957 | A1 | 7/2017 |
| WO | WO-2017167169 | A1 | 10/2017 |
| WO | WO-2017167513 | A1 | 10/2017 |
| WO | WO-2018068602 | A1 | 4/2018 |
| WO | WO-2019148516 | A1 | 8/2019 |

OTHER PUBLICATIONS

English machine translation of WO 015143765 A1; Li-Yousheng; Oct. 1, 2015; 22 pages. (Year: 2015).*

English machine translation of WO-2014020953-A1 to Shimizu; 11 pages; Feb. 6, 2014. (Year: 2014).*

English machine translation of CN 203388272 U; Liu, Qiu-ming; Jan. 15, 2014; 15 pages. (Year: 2014).*

* cited by examiner

100

100

110                                       120

100

304

202

213

112

213

202

112

500

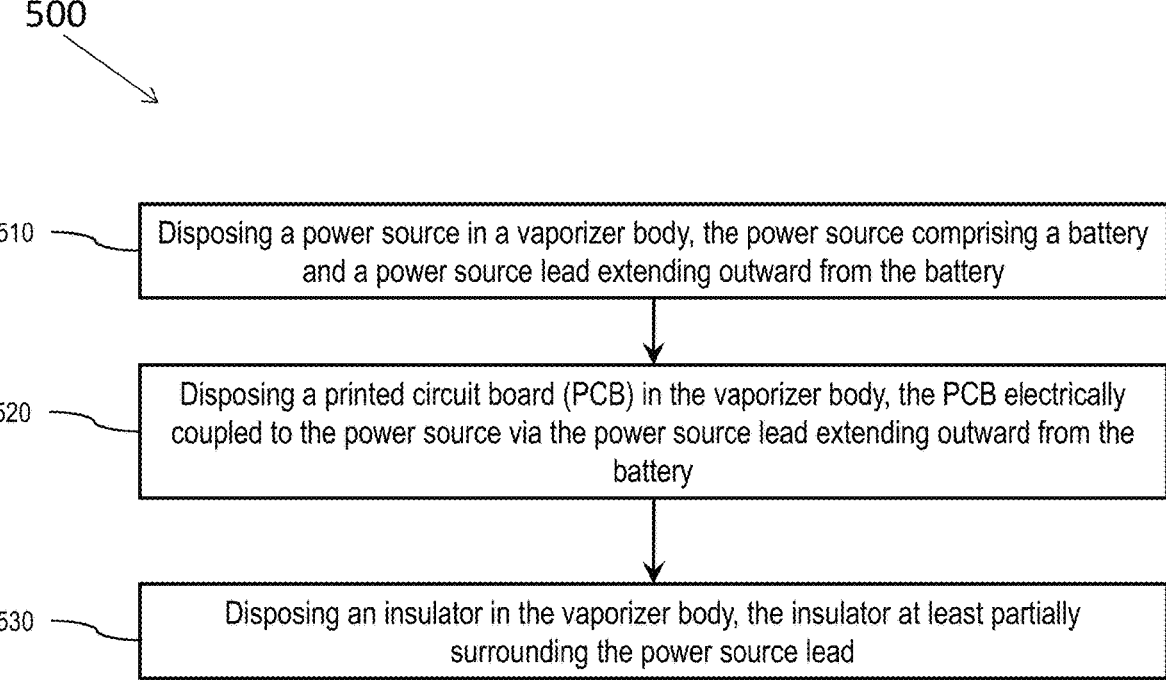

510 — Disposing a power source in a vaporizer body, the power source comprising a battery and a power source lead extending outward from the battery 520 — Disposing a printed circuit board (PCB) in the vaporizer body, the PCB electrically coupled to the power source via the power source lead extending outward from the battery 530 — Disposing an insulator in the vaporizer body, the insulator at least partially surrounding the power source lead

FIG. 5

SAFETY FEATURE FOR BATTERY CELL DESIGN

CROSS REFERENCE TO RELATED APPLICATIONS

This application is a bypass continuation and claims priority to PCT/US20/60522, filed on Nov. 13, 2020 and entitled "Safety Feature for Battery Cell Design" which claims priority to and the benefit of U.S. Provisional Application No. 62/936,123, filed Nov. 15, 2019, which are hereby incorporated by reference in their entirety and for all purposes.

TECHNICAL FIELD

The subject matter described herein relates to vaporizer devices, including a safety feature for battery cell.

BACKGROUND

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic cigarettes, which may also be referred to as e-cigarettes, are a class of vaporizer devices that are typically battery powered and that may be used to simulate the experience of cigarette smoking, but without burning of tobacco or other substances.

In use of a vaporizer device, the user inhales an aerosol, commonly called vapor, which may be generated by a heating element that vaporizes (which generally refers to causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a part of the vaporizer that contains the vaporizable material in a reservoir) that includes a mouthpiece (e.g., for inhalation by a user).

To receive the inhalable aerosol generated by a vaporizer device, a user may, in certain examples, activate the vaporizer device by taking a puff, by pressing a button, or by some other approach. A puff, as the term is generally used (and also used herein), refers to inhalation by the user in a manner that causes a volume of air to be drawn into the vaporizer device such that the inhalable aerosol is generated by a combination of vaporized vaporizable material with the air.

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable material to form a vapor for inhalation by a user of the vaporization device.

Currently available vaporizers often include one or more battery cells, such as non-rechargeable primary battery cells and/or rechargeable secondary battery cells, as a power source. Certain batteries may include components, such as exposed terminals and/or the like, that can render the battery susceptible to developing a short circuit. For example, an internal short circuit may develop in a battery if the exposed terminals of the battery come into contact with each other, another component of the battery, a foreign material, and/or a component of the vaporizer device. As such, improved vaporization devices and/or vaporization cartridges that improve upon or overcome these issues are desired.

SUMMARY

Aspects of the current subject matter relate to methods and systems for protecting a battery cell and/or a /pack of multiple battery cells serving as a power source of a vaporizer device from developing a short-circuit in a vaporizer device. In one aspect, a vaporizer device is provided. The vaporizer device may include a power source including a battery and a power source lead extending outward from a distal end of the battery. The vaporizer device may further include a printed circuit board (PCB) electrically coupled to the power source via the power source lead extending outward from the battery. The vaporizer device may further include an insulator at least partially surrounding the power source lead. The insulator may be mechanically coupled to at least one of the power source and the PCB.

In some variations, one or more of the following features may optionally be included in any feasible combination. The insulator may include a polymer or plastic material. The insulator may be coupled to a distal end of the PCB and coupled to a proximal end of the power source. The insulator may couple to the PCB within a recess of the proximal end of the power source. The PCB may be positioned superior to the insulator. The insulator may include an additional insulator piece installed superior to the PCB. The insulator may include an aperture. The insulator may couple to the PCB via laser welding. The laser welding may include welding a weld tab of the PCB to the power source lead. The insulator may include an aperture configured to allow a laser beam to pass therethrough and contact the weld tab. The insulator may be configured to secure the PCB in a fixed position with respect to the power source.

In one aspect, a method is provided. The method includes disposing a power source in a vaporizer body. The power source including a battery and a power source lead extending outward from a distal end of the battery. The method further includes disposing a printed circuit board (PCB) in the vaporizer body, the PCB electrically coupled to the power source via the power source lead extending outward from the battery. The method further includes disposing an insulator in the vaporizer body. The insulator at least partially surrounding the power source lead. The insulator may be mechanically coupled to at least one of the power source and the PCB. Disposing the insulator may include coupling the insulator to a distal end of the PCB and coupling the insulator to a proximal end of the power source.

In some variations, one or more of the following features may optionally be included in any feasible combination. The method may further include mechanically coupling the insulator to the PCB subsequent to disposing the PCB in the vaporizer body. The method may further include welding a weld tab of the PCB to the power source lead in order to form the electric coupling between the PCB and the power source. Disposing the insulator may include disposing the insulator within a recess at a proximal end of the power source. The PCB may be positioned superior to the insulator. The insulator may include an aperture configured to allow a laser beam to pass therethrough and contact the weld tab. The method may further include disposing an additional insulator piece superior to the PCB.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 5 depicts an example flowchart illustrating an example of a process for assembling a vaporizer device, consistent with implementations of the current subject matter.

When practical, similar reference numbers denote similar structures, features, or elements.

DETAILED DESCRIPTION

Implementations of the current subject matter include devices relating to vaporizing of one or more materials for inhalation by a user. The term "vaporizer" is used generically in the following description to refer to a vaporizer device. Examples of vaporizers consistent with implementations of the current subject matter include electronic vaporizers, electronic cigarettes, e-cigarettes, or the like. Such vaporizers are generally portable, hand-held devices that heat a vaporizable material to provide an inhalable dose of the material.

The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material.

In various implementations, a vaporizer may be configured for use with liquid vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A liquid vaporizable material can likewise be capable of being completely vaporized or can include some part of the liquid material that remains after all of the material suitable for inhalation has been consumed.

Figure 1A:
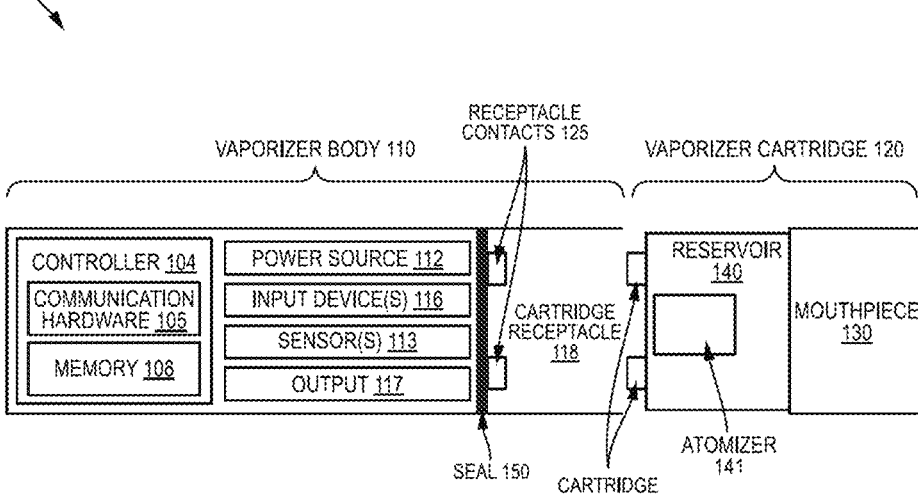
FIG. 1A illustrates a block diagram of a vaporizer consistent with implementations of the current subject matter.

Referring to the block diagram of FIG. 1A, a vaporizer 100 typically includes a power source 112 (such as a battery which may be a rechargeable battery), and a controller 104 (e.g., a processor, circuitry, etc. capable of executing logic) for controlling delivery of heat to an atomizer 141 to cause a vaporizable material to be converted from a condensed form (e.g., a solid, a liquid, a solution, a suspension, a part of an at least partially unprocessed plant material, etc.) to the gas phase. The controller 104 may be part of one or more printed circuit boards (PCBs) consistent with certain implementations of the current subject matter.

After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 100 for a given puff or draw on the vaporizer. It will be understood that the interplay between gas and condensed phases in an aerosol generated by a vaporizer can be complex and dynamic, as factors such as ambient temperature, relative humidity, chemistry, flow conditions in airflow paths (both inside the vaporizer and in the airways of a human or other animal), mixing of the gas-phase or aerosol-phase vaporizable material with other air streams, etc. may affect one or more physical parameters of an aerosol. In some vaporizers, and particularly for vaporizers for delivery of more volatile vaporizable materials, the inhalable dose may exist predominantly in the gas phase (i.e., formation of condensed phase particles may be very limited).

Vaporizers for use with liquid vaporizable materials (e.g., neat liquids, suspensions, solutions, mixtures, etc.) typically include an atomizer 141 in which a wicking element (also referred to herein as a wick (not shown in FIG. 1A), which can include any material capable of causing fluid motion by capillary pressure) conveys an amount of a liquid vaporizable material to a part of the atomizer that includes a heating element (also not shown in FIG. 1A). The wicking element is generally configured to draw liquid vaporizable material from a reservoir configured to contain (and that may in use contain) the liquid vaporizable material such that the liquid vaporizable material may be vaporized by heat delivered from a heating element. The wicking element may also optionally allow air to enter the reservoir to replace the volume of liquid removed. In other words, capillary action pulls liquid vaporizable material into the wick for vaporization by the heating element (described below), and air may, in some implementations of the current subject matter, return to the reservoir through the wick to at least partially equalize pressure in the reservoir. Other approaches to allowing air back into the reservoir to equalize pressure are also within the scope of the current subject matter.

The heating element can be or include one or more of a conductive heater, a radiative heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer can include a heating element that includes resistive coil or other heating element wrapped around, positioned within, integrated into a bulk shape of, pressed into thermal contact with, or otherwise arranged to deliver heat to a wicking element to cause a liquid vaporizable material drawn by the wicking element from a reservoir to be vaporized for subsequent inhalation by a user in a gas and/or a condensed (e.g., aerosol particles or droplets) phase. Other wicking element, heating element, and/or atomizer assembly configurations are also possible, as discussed further below.

Certain vaporizers may also or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves) containing the vaporizable material. In such vaporizers, a resistive heating element may be part of or otherwise incorporated into or in thermal contact with the walls of an oven or other heating chamber into which the non-liquid vaporizable material is placed. Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to only by conduction inward from walls of an oven).

The heating element may be activated (e.g., by a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece 130 of the vaporizer to cause air to flow from an air inlet, along an airflow path that passes an atomizer (e.g., wicking element and heating element), optionally through one or more condensation areas or chambers, to an air outlet in the mouthpiece. Incoming air passing along the airflow path passes over, through, etc. the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 130 for inhalation by a user).

Activation of the heating element may be caused by automatic detection of the puff based on one or more of signals generated by one or more sensors 113, such as for example a pressure sensor or sensors disposed to detect pressure along the airflow path relative to ambient pressure (or optionally to measure changes in absolute pressure), one or more motion sensors of the vaporizer, one or more flow sensors of the vaporizer, a capacitive lip sensor of the vaporizer; in response to detection of interaction of a user with one or more input devices 116 (e.g., buttons or other tactile control devices of the vaporizer 100), receipt of signals from a computing device in communication with the vaporizer; and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the controller 104 may include communication hardware 105. The controller 104 may also include a memory 108. A computing device can be a component of a vaporizer system that also includes the vaporizer 100, and can include its own communication hardware, which can establish a wireless communication channel with the communication hardware 105 of the vaporizer 100. For example, a computing device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer can also include one or more output 117 features or devices for providing information to the user.

In the example in which a computing device provides signals related to activation of the resistive heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element, either to a full operating temperature for creation of an inhalable dose of vapor/aerosol. Other functions of the vaporizer may be controlled by interaction of a user with a user interface on a computing device in communication with the vaporizer.

The temperature of a resistive heating element of a vaporizer may depend on a number of factors, including an amount of electrical power delivered to the resistive heating element and/or a duty cycle at which the electrical power is delivered, conductive heat transfer to other parts of the electronic vaporizer and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the electronic vaporizer). As noted above, to reliably activate the heating element or heat the heating element to a desired temperature, a vaporizer may, in some implementations of the current subject matter, make use of signals from a pressure sensor to determine when a user is inhaling. The pressure sensor can be positioned in the airflow path and/or can be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer device from the air inlet to the air outlet. In some implementations of the current subject matter, the heating element may be activated in association with a user's puff, for example by automatic detection of the puff, for example by the pressure sensor detecting a pressure change in the airflow path.

Typically, the pressure sensor (as well as any other sensors 113) can be positioned on or coupled (e.g., electrically or electronically connected, either physically or via a wireless connection) to the controller 104 (e.g., a printed circuit board assembly or other type of circuit board). To take measurements accurately and maintain durability of the vaporizer, it can be beneficial to provide a resilient seal 150 to separate an airflow path from other parts of the vaporizer. The seal 150, which can be a gasket, may be configured to at least partially surround the pressure sensor such that connections of the pressure sensor to internal circuitry of the vaporizer are separated from a part of the pressure sensor exposed to the airflow path. In an example of a cartridge-based vaporizer, the seal 150 may also separate parts of one or more electrical connections between a vaporizer body 110 and a vaporizer cartridge 120. Such arrangements of a seal 150 in a vaporizer 100 can be helpful in mitigating against potentially disruptive impacts on vaporizer components resulting from interactions with environmental factors such as water in the vapor or liquid phases, other fluids such as the vaporizable material, etc. and/or to reduce escape of air from the designed airflow path in the vaporizer. Unwanted air, liquid or other fluid passing and/or contacting circuitry of the vaporizer can cause various unwanted effects, such as alter pressure readings, and/or can result in the buildup of unwanted material, such as moisture, the vaporizable material, etc. in parts of the vaporizer where they may result in poor pressure signal, degradation of the pressure sensor or other components, and/or a shorter life of the vaporizer. Leaks in the seal 150 can also result in a user inhaling air that has passed over parts of the vaporizer device containing or constructed of materials that may not be desirable to be inhaled.

A vaporizer may include a vaporizer body 110 that includes a controller 104, a power source 112 (e.g., battery), one more sensors 113, charging contacts 124, a seal 150, and a cartridge receptacle 118 configured to receive a vaporizer cartridge 120 for coupling with the vaporizer body through one or more of a variety of attachment structures. In some examples, vaporizer cartridge 120 includes a reservoir 140 for containing a liquid vaporizable material and a mouthpiece 130 for delivering an inhalable dose to a user. The vaporizer cartridge can include an atomizer 141 having a wicking element and a heating element (or alternatively, one or both of the wicking element and the heating element can be part of the vaporizer body). In implementations in which any part of the atomizer 141 (e.g., heating element and/or wicking element) is part of the vaporizer body, the vaporizer can be configured to supply liquid vaporizer material from a reservoir in the vaporizer cartridge to the atomizer part(s) included in the vaporizer body.

In vaporizers in which the power source 112 is part of a vaporizer body 110 and a heating element is disposed in a vaporizer cartridge 120 configured to couple with the vaporizer body 110, the vaporizer 100 may include electrical connection features (e.g., means for completing a circuit) for completing a circuit that includes the controller 104 (e.g., a printed circuit board, a microcontroller, or the like), the power source, and the heating element. These features may include at least two contacts 124 on a bottom surface of the vaporizer cartridge 120 (referred to herein as cartridge contacts 124) and at least two contacts 125 disposed near a base of the cartridge receptacle (referred to herein as receptacle contacts 125) of the vaporizer 100 such that the cartridge contacts 124 and the receptacle contacts 125 make electrical connections when the vaporizer cartridge 120 is inserted into and coupled with the cartridge receptacle 118. The circuit completed by these electrical connections can allow delivery of electrical current to the resistive heating element and may further be used for additional functions, such as, for example, for measuring a resistance of the resistive heating element for use in determining and/or controlling a temperature of the resistive heating element based on a thermal coefficient of resistivity of the resistive heating element, for identifying a cartridge based on one or more electrical characteristics of a resistive heating element or the other circuitry of the vaporizer cartridge, etc.

In some examples of the current subject matter, the at least two cartridge contacts and the at least two receptacle contacts can be configured to electrically connect in either of at least two orientations. For example, one or more circuits necessary for operation of the vaporizer can be completed by insertion of a vaporizer cartridge 120 in the cartridge receptacle 118 in a first rotational orientation (around an axis along which the end of the vaporizer cartridge having the cartridge is inserted into the cartridge receptacle 118 of the vaporizer body 110) such that a first set of cartridge contacts of the at least two cartridge contacts 124 is electrically connected to a first set of receptacle contacts of the at least two receptacle contacts 125 and a second set of cartridge contacts of the at least two cartridge contacts 124 is electrically connected to a second set of receptacle contacts of the at least two receptacle contacts 125. Furthermore, the one or more circuits necessary for operation of the vaporizer can be completed by insertion of a vaporizer cartridge 120 in the cartridge receptacle 118 in a second rotational orientation such that the first set of cartridge contacts of the at least two cartridge contacts 124 is electrically connected to the second set of receptacle contacts of the at least two receptacle contacts 125 and the second set of cartridge contacts of the at least two cartridge contacts 124 is electrically connected to the first set of receptacle contacts of the at least two receptacle contacts 125.

In some implementations, the power source 112 may include a battery cell (or a battery pack including multiple battery cells) connected to a printed circuit board (PCB) forming the controller 104 of the vaporizer 100. In some aspects, the electrical terminals of the battery cell (or battery pack) may be exposed to external forces (e.g., contact from machine tools, jostling during transportation, external temperatures/weather, or the like) that may cause deformation or electrical shortage of the terminals. In some implementations, in order to prevent or reduce the effects of these external forces, the electrical terminals may be positioned in different locations of the battery cell or battery pack. The electrical terminals of the battery cell (or battery pack) may be coupled to the electrical contacts of the controller 104 (e.g., PCB 104).

In some aspects, the battery cell may be encased in a shell of the vaporizer body 110. For example, the encased battery cell may include an anode, an anode current collector, a cathode, a cathode current collector, a separator, and an electrolyte disposed within a hermetic chamber formed by hermetically sealing a portion of the shell of the vaporizer body 110.

Figure 2:
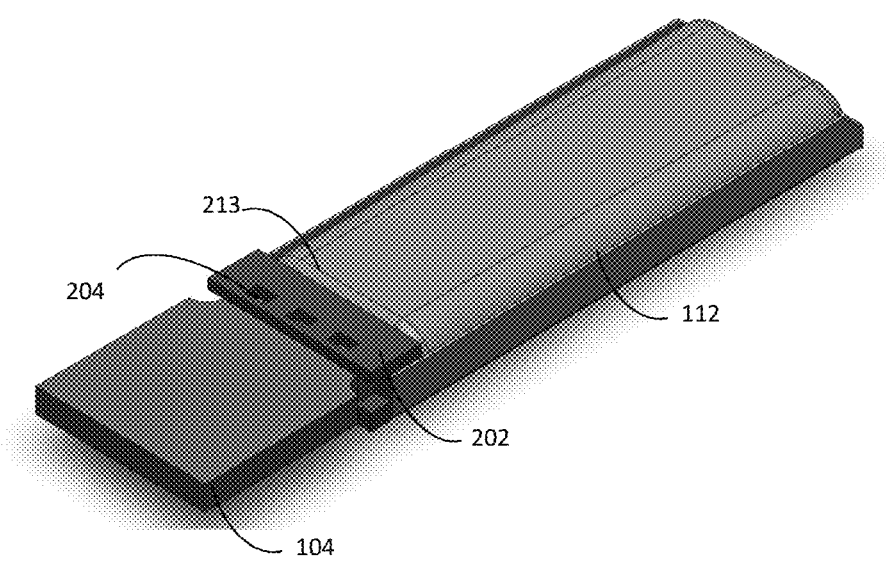
FIG. 2 illustrates an example assembly method for coupling a battery to a printed circuit board (PCB), in accordance with one or more implementations.

Encasing the battery cell within the shell of the vaporizer body 110 can leave one or more battery terminals exposed, for example, in a recess at a proximal end 213 of the battery cell (e.g., power source 112). FIG. 2 illustrates an example assembly method for connecting a power source 112 to a controller 104. As shown in FIG. 2, the controller 104 (e.g., a PCB) is coupled to the power source 112 at a proximal end 213 of the power source 112. As further shown, an insulator 202 is located between, and coupled to, the controller 104 and the power source 112. The insulator 202 may be formed from an insulation material including, for example, one or more plastics, polymers, and/or the like. The insulator 202 may therefore electrically isolate power leads or other electrical circuitry extending from the power source 112 (e.g., a power source lead of a battery cell/pack).

Connecting the power source (e.g. a battery) 112 to the PCB 104 may be achieved by welding leads from the power source 112 to a weld point or weld tab on the PCB 104. Welding may be accomplished by various types of welding, including laser welding. A suitable type of welding head with optic focusing characteristics can be selected based on the welding tab thickness and material, as well a manufacturing process throughput. As shown in FIG. 2, the insulator 202 may include one or more apertures (e.g. a hole or slit) 204 to allow a laser beam to pass therethrough and contact a weld tab (not shown) disposed on a side of PCB 104. The weld tab may be configured to be laser welded to the power source lead (e.g. the battery lead) extending from the power source 112. The weld tab may optionally be configured to include a hole or a slit (not shown) to allow a portion of a laser welding beam to pass through the weld tab to form a fillet weld with power source lead. Alternatively, the weld tab may be positioned at the edge of, and extend outward from, the PCB 104.

In addition to welding the power source lead to a well tab of the PCB, other forms and means of coupling the PCB 104 to the power source 112 are possible. For example, the power source 112 may include a recess or receptacle at the proximal end 213 configured to mate with and/or receive at least a portion of the PCB 104. The portion of the PCB 104 may be configured to mate with the recess or receptacle of the power source 112 and may further include a spring or other retention mechanism for coupling to and/or retaining a position within the recess or receptacle. Additionally, in some implementations, the insulator 202 may be configured to facilitate the coupling of the PCB 104 to the power source 112. For example, the insulator 202 may be configured to secure the PCB 104 in a fixed position with respect to the power source 112.

Power source 112 may have one or more power source lead(s) to electrically conduct power to the vaporizer device 100 and/or the cartridge 120. For example, power source 112 may be a battery, and a power source lead may include a positive lead and a negative lead to transmit power to the PCB 104. A weld tab may be attached to the power source lead via a noncontact welding process, filler-less welding process, fillet-less welding process, or any other suitable welding process. The PCB 104 may include an aperture extending from the top side of PCB 104 to expose a weld tab attached to the bottom side of PCB 104. The PCB 104 may optionally be configured without an aperture. In some aspects, the power source 112 and/or the PCB 104 may include a magnet configured to couple to the PCB 104 or the power source 112, respectively.

Figure 3A:
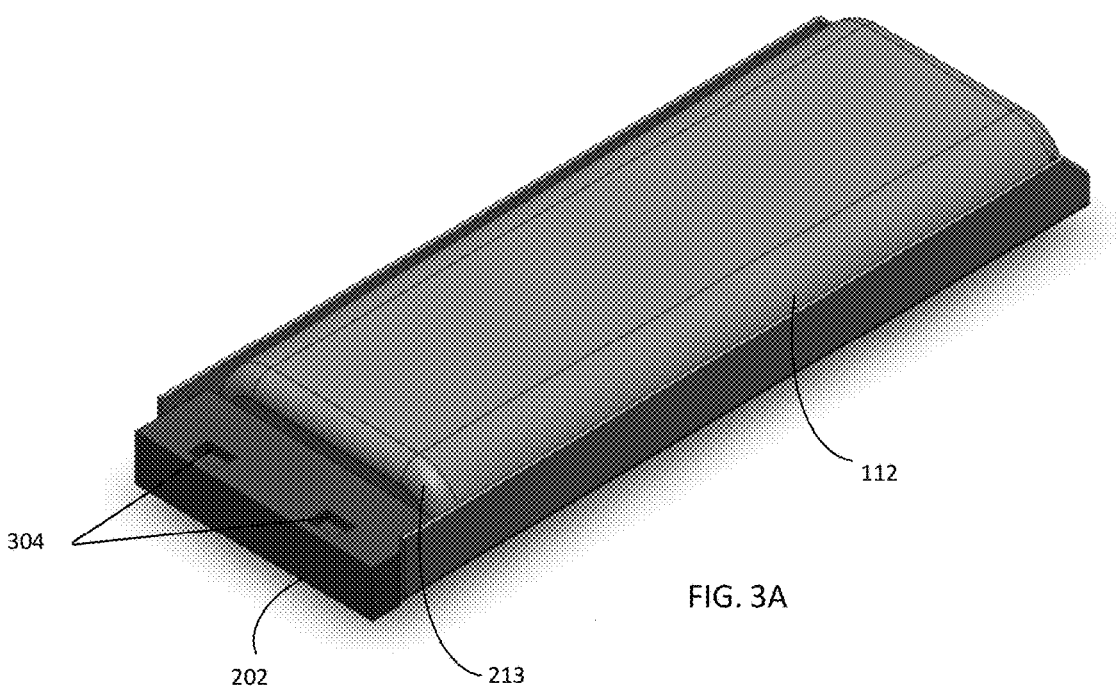
FIGS. 3A-3B show an example assembly method for connecting the insulator to the power source, consistent with implementations of the current subject matter.
Figure 3B:
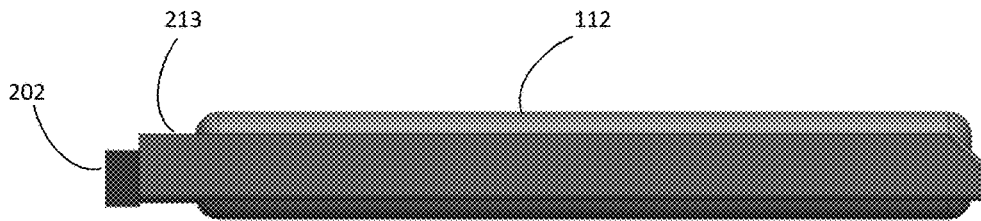

FIGS. 3A-3B show an example assembly method for connecting the insulator 202 to the power source 112, consistent with implementations of the current subject matter. As shown in FIG. 3A, the insulator 202 is coupled to the proximal end 213 of the power source 112. As further shown in FIG. 3A, the insulator 202 includes recesses 304. The recesses 304 may be located on an exterior side of the insulator 202 and may be configured to allow a laser beam to pass therethrough and contact a weld tab of the PCB 104 to couple the PCB 104 to the power source 112. The weld tab may be configured to be laser welded to a power source lead (e.g. a battery lead) extending from the power source 112. The recesses 304 may also be configured to mechanically receive (e.g., mate with) extensions of the PCB 104 to facilitate coupling the power source 112 to the PCB 104 (see FIG. 4A). FIG. 3B shows a side view of the insulator 202 coupled to the proximal end 213 of the power source 112.

Figures 4A, 4B:
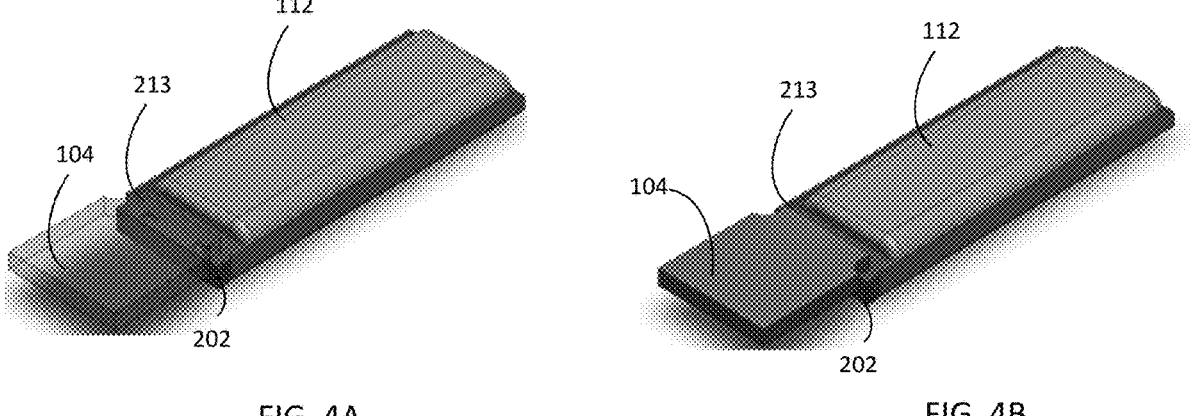
FIGS. 4A-4C show an example assembly method for coupling a printed circuit board to the insulator, consistent with implementations of the current subject matter.
Figure 4C:
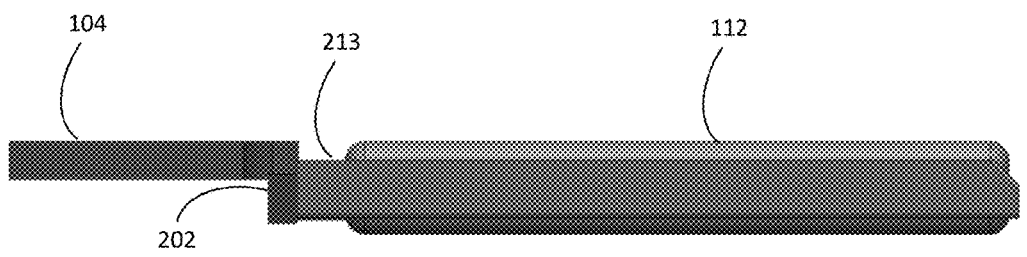

FIGS. 4A-4C show an example assembly method for coupling the PCB 104 to the insulator 202, consistent with implementations of the current subject matter. As shown in FIGS. 4A-4C, the PCB 104 is installed above (e.g., superior to) the insulator 202 at the proximal end 213. In some implementations, and additional insulator 202 piece may be installed above (e.g., superior to) the PCB 104. For example, a distal portion of the PCB 104 may be sandwiched between portions of the insulator 202 (e.g., as shown in FIG. 2). As further shown in FIGS. 4A-4C, a distal end of the PCB 104 couples to the insulator 202 within a recess of the proximal end 213. FIG. 4C shows a side view of the PCB 104 and the insulator 202 coupled to the power source 112.

FIG. 5 is a flowchart illustrating a process 500 for assembling a vaporizer device, in accordance with some example implementations. In some aspects, the process 500 may be implemented by a computing device having one or more processors, such as a smartphone, a tablet computer, a laptop, a vaporizer, or the like.

At operational block 510, the process 500 may include disposing a power source in a vaporizer body. The power source may include a battery and a power source lead extending outward from the battery. For example, the power source may include a rechargeable battery. The power source may include a recess at a proximal end of the battery.

At operational block 520, the process 500 may include disposing a printed circuit board (PCB) in the vaporizer body, the PCB electrically coupled to the power source via the power source lead extending outward from the battery. For example, a distal end of the PCB may couple to the proximal end of the power source. The coupling may include welding a weld tab of the PCB to the power source lead in order to form the electric coupling between the PCB and the power source.

At operational block 530, the process 500 may include disposing an insulator in the vaporizer body, the insulator at least partially surrounding the power source lead. For example, the insulator may be mechanically coupled to at least one of the power source (e.g., the power source lead) and the PCB (e.g., via the weld tab). In some aspects, the insulator may be mechanically coupled to the proximal end of the battery or the power source lead via an adhesive (e.g., a glue, a pressure sensitive adhesive, a resin, or the like), mechanical connectors disposed on the insulator and/or the battery (e.g., pins and recesses), friction fit, welding, magnets or magnetic force, or the like. Disposing the insulator may include disposing the insulator within the recess at the proximal end of the power source (e.g., proximal end of the battery). The insulator may include a polymer material. Disposing the insulator may include coupling the insulator to a distal end of the PCB and coupling the insulator to the proximal end of the power source.

In some aspects, the process 500 may optionally include mechanically coupling the insulator to the PCB subsequent to disposing the PCB in the vaporizer body. For example, the PCB may be positioned superior to the insulator. Mechanically coupling the insulator to the PCB may include disposing an additional insulator piece superior to the PCB.

In some examples, the vaporizer cartridge 120, or at least an end of the vaporizer cartridge configured for insertion in the cartridge receptacle 118 may have a non-circular cross section transverse to the axis along which the vaporizer cartridge is inserted into the cartridge receptacle. For example, the non-circular cross section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape indicates that a basic likeness to the described shape is apparent, but that sides of the shape in question need not be completely linear and vertices need not be completely sharp. Rounding of both or either of edges or vertices of the cross-sectional shape is contemplated in the description of any non-circular cross section referred to herein.

Figure 1B:
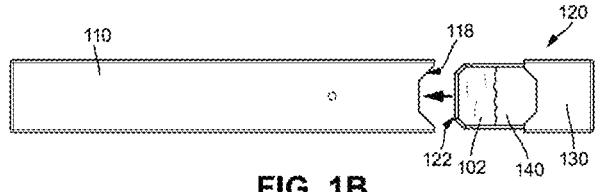
FIGS. 1B-1F illustrate example variations of a vaporizer and cartridge assembly consistent with implementations of the current subject matter.

FIG. 1B illustrates an embodiment of the vaporizer device body 110 having a cartridge receptacle 118 into which the cartridge 120 may be releasably inserted. FIG. 1B shows a top view of the vaporization device 100 illustrating the cartridge 120 being positioned for insertion into the vaporizer device body 110. When a user puffs on the vaporization device 100, air may pass between an outer surface of the cartridge 120 and an inner surface of a cartridge receptacle 118 on the vaporizer device body 110. Air can then be drawn into an insertable end 122 of the cartridge, through the vaporization chamber that includes or contains the heating element and wick, and out through an outlet of the mouthpiece 130 for delivery of the inhalable aerosol to a user. The reservoir 140 of the cartridge 120 may be formed in whole or in part from translucent material such that a level of vaporizable material 102 is visible along the cartridge 120.

Figure 1C:
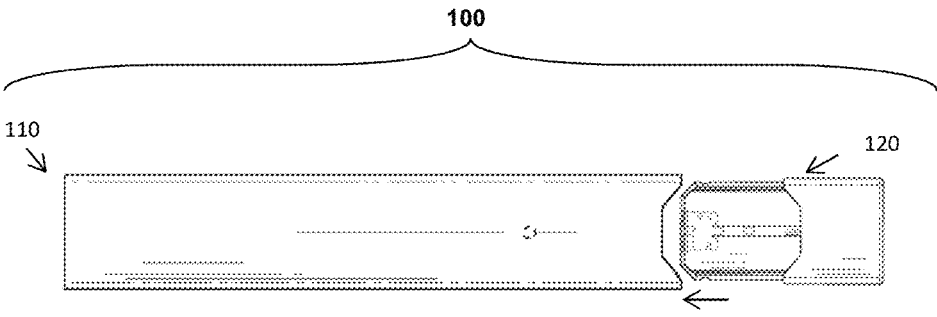
Figure 1D:
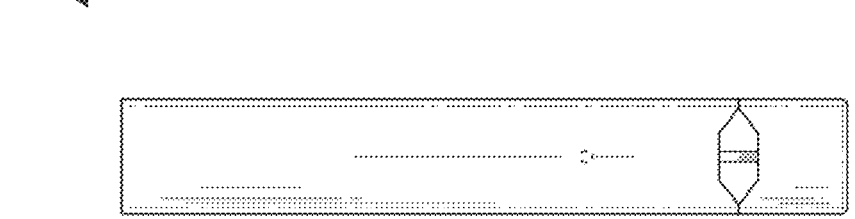
Figure 1E:
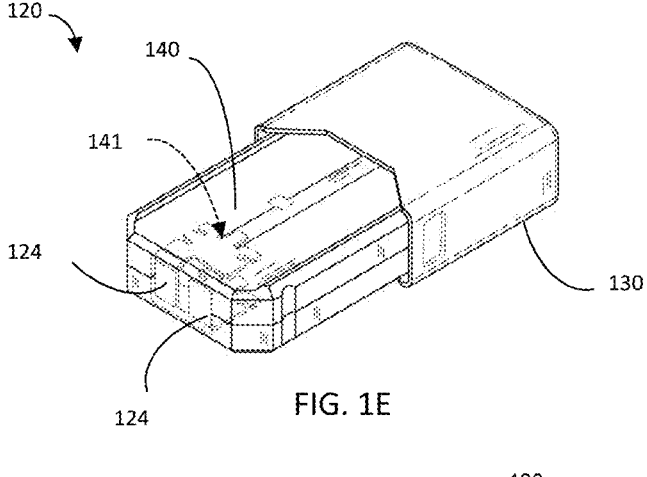
Figure 1F:
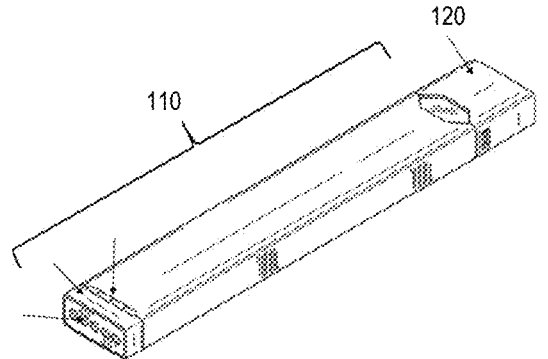

FIGS. 1C and 1D show top views before and after connecting a cartridge 120 to a vaporizer body 110. FIG. 1E shows a perspective view of one variation of a cartridge 120 holding a liquid vaporizable material. In general, when a vaporizer includes a cartridge (such as the cartridge 120), the cartridge 120 may include one or more reservoirs 140 of vaporizable material. Any appropriate vaporizable material may be contained within the reservoir 140 of the cartridge 120, including solutions of nicotine or other organic materials.

FIGS. 1B to 1F illustrate an example of a vaporizer 100 with a vaporizer body 110 and cartridge 120. Vaporizer body 110 and cartridge 120 are shown unconnected in FIGS. 1B and 1C and connected in FIG. 1D. FIG. 1D shows a perspective view of the combined vaporizer body 110 and cartridge 120, and FIG. 1E shows an individual cartridge 120. FIGS. 1B-1F show an example including many of the features generally shown in FIG. 1A. Other configurations, including some or all of the features described herein, are also within the scope of the current subject matter.

The at least two cartridge contacts 124 and the at least two receptacle contacts 125 can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body. The electrical contacts may optionally be gold-plated, and/or can include other materials.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A vaporizer device, the vaporizer device comprising:
a power source comprising a battery and a power source
   lead extending outward from the battery;

a printed circuit board (PCB) electrically coupled to the power source via the power source lead extending outward from the battery; and an insulator at least partially surrounding the power source lead, the insulator being mechanically and directly coupled to a distal end of the PCB and a proximal end of the power source;

wherein the PCB is at least partially in physical contact with a portion of the battery; and wherein the insulator couples to the PCB within a recess of the proximal end of the power source.

2. The vaporizer device of claim 1, wherein the insulator comprises a polymer material.

3. The vaporizer device of claim 1, wherein the PCB is positioned superior to the insulator.

4. The vaporizer device of claim 1, wherein the insulator comprises an additional insulator piece installed superior to the PCB.

5. The vaporizer device of claim 1, wherein the insulator comprises an aperture.

6. The vaporizer device of claim 1, wherein the insulator is coupled to the PCB via a laser weld.

7. The vaporizer device of claim 6, wherein the laser weld comprises a weld tab coupled to the power source lead.

8. The vaporizer device of claim 7, wherein the insulator comprises an aperture.

9. The vaporizer device of claim 1, wherein the insulator is configured to secure the PCB in a fixed position with respect to the power source.

* * * * *